(12) United States Patent
Koh et al.

(10) Patent No.: US 8,072,699 B2
(45) Date of Patent: Dec. 6, 2011

(54) SOLID IMMERSION LENS OPTICS ASSEMBLY

(75) Inventors: Lian Ser Koh, Singapore (SG); Choon Meng Chua, Singapore (SG); Wah Pheng Chua, Singapore (SG); Chee Hong Jacob Phang, Singapore (SG); Soon Huat Tan, Singapore (SG)

(73) Assignee: Semicaps Pte Ltd, Singapore (SG)

( * ) Notice: Subject to any disclaimer, the term of this patent is extended or adjusted under 35 U.S.C. 154(b) by 189 days.

(21) Appl. No.: 12/486,509

(22) Filed: Jun. 17, 2009

(65) Prior Publication Data

US 2010/0321678 A1 Dec. 23, 2010

(51) Int. Cl.
*G02B 7/02* (2006.01)
*G02B 21/00* (2006.01)

(52) U.S. Cl. ........ 359/819; 359/811; 359/368; 359/381; 359/382

(58) Field of Classification Search ............... 359/811, 359/819, 823, 368, 379, 381, 391; 356/36, 356/237.1, 237.5; 324/537, 754.23; 369/44.23, 369/44.29, 112.24, 244
See application file for complete search history.

(56) References Cited

U.S. PATENT DOCUMENTS

| | | | |
|---|---|---|---|
| 6,327,080 B1 * | 12/2001 | Brinkmann et al. | 359/381 |
| 6,346,076 B1 * | 2/2002 | Rovegno | 600/173 |
| 6,828,811 B2 | 12/2004 | Hanson et al. | |
| 7,019,913 B1 * | 3/2006 | Wang | 359/694 |
| 7,123,035 B2 | 10/2006 | Hanson et al. | |
| 7,227,702 B2 | 6/2007 | Pakdaman et al. | |
| 7,414,800 B2 * | 8/2008 | Isobe et al. | 359/811 |
| 7,639,025 B2 * | 12/2009 | Hanson et al. | 324/756.03 |
| 2010/0202041 A1 * | 8/2010 | Terada et al. | 359/368 |

\* cited by examiner

*Primary Examiner* — Loha Ben
(74) *Attorney, Agent, or Firm* — Volpe and Koenig P.C.

(57) ABSTRACT

A solid immersion lens optics assembly, a test station for probing and testing of integrated circuits on a semiconductor wafer, and a method of landing a SIL on an object. The optics assembly comprises an objective lens housing for receiving an objective lens, and a solid immersion lens (SIL) housing for mounting an SIL and adapted for connection to the objective lens housing; wherein a peripheral wall of the SIL housing comprises an integrated spring section adapted to provide a biased support for the SIL.

10 Claims, 5 Drawing Sheets

SOLID IMMERSION LENS OPTICS ASSEMBLY

FIELD OF INVENTION

The present invention relates broadly to a solid immersion lens (SIL) optics assembly, to a test station for probing and testing integrated circuit on a semiconductor wafer and to a method of landing a SIL on an object.

BACKGROUND

Microscopes are used in a large variety of technological applications, including in probing and testing of semiconductor microchips. With increasing metal layers and flip chip bonding, analysis of the integrated circuit (IC) can typically only be done from the backside of the chip through the silicon substrate using infrared imaging. Shrinking device geometry requires high numerical aperture (NA) lenses to resolve the transistors. In such applications, the optics plays a crucial part in device imaging, signal collection and optical probing, and in particular when the signal is optically weak.

In one existing type of optics for, e.g., probing and testing of semiconductor microchips, a SIL is placed between the object and an objective lens, with or without the use of an index matching medium between the SIL and the semiconductor microchip. The increased NA of the SIL-Objective arrangement allows higher resolution imaging, higher signal collection efficiency and smaller spot size for optical probing.

In such SIL-Objective optical arrangements, the challenges are to maintain the SIL and objective optical axis alignment when placing and focusing the SIL on the device, accommodating a small degree of tilt between device and SIL, and applying bias to eliminate the air gap at the SIL-device interface.

One existing solution in U.S. Pat. No. 7,123,035 provides the SIL attached to a bracket that is spring loaded by springs to a housing containing the objective lens. The springs extend readily inwardly from the housing and are coupled to the bracket carrying the SIL, substantially at a periphery of the SIL. Specific details as to the nature of the springs and the actual connection of the springs to the housing on the one hand, and the bracket carrying the SIL on the other hand are not provided. However, it is believed that in such a design there would be a number of practical implementation issues such as a potential vignetting effect from the springs, in particular in the biased stage upon landing of the SIL, as well as issues relating to choice of the number of springs to be used, and/or uniformity of the applied bias.

In another design described in U.S. Pat. No. 7,123,035, the SIL is fixedly attached to a SIL housing, and the objective lens is fixedly attached to an objective housing. Both the SIL housing and the objective housing are substantially cylindrical, with the SIL housing being received within the objective housing, and in a manner such that a sliding motion of the SIL housing relative to the objective housing is enabled in a biased fashion. One or more linear springs are disposed within the objective housing at its periphery, for biasing the SIL housing. Disadvantages or challenges associated with such a design include the limited, if any, ability of accommodating angular displacement between the SIL housing and the objective housing, for example as a result of landing on a surface slanted with respect to the SIL and objective housings, as well as friction between the SIL housing and the objective housing, resulting in backlash during focusing. Furthermore, since a sliding fit between the SIL housing and objective housing is required, as there is relative movement, the centering and imaging repeatability is limited by the tolerances required for the sliding fit.

A need therefore exists to provide an alternative system and method that seek to address at least one of the above-mentioned problems.

SUMMARY

In accordance with a first aspect of the present invention, there is provided a solid immersion lens (SIL) optics assembly comprising an objective lens housing for receiving an objective lens, and a SIL housing for mounting a SIL and adapted for connection to the objective lens housing; wherein a peripheral wall of the SIL housing comprises an integrated spring section adapted to provide a biased support for the SIL.

The wall of the SIL housing may be cylindrical, and the spring section may comprise a radial spring along a circumference of the cylindrical housing.

The radial spring may comprise a single start helix or multiple start helix spring.

The assembly may further comprise a SIL holder adapted for mounting the SIL, and adapted for connection at a top end of the SIL housing.

The SIL holder may comprise a conical mount element extending from a base portion, the conical mount element adapted for mounting the SIL at an apex thereof.

The assembly may further comprise a spacer element for interconnection between the SIL housing and the objective lens housing.

Components of the assembly are adapted for threaded engagement with each other.

The assembly may further comprise the objective lens.

The assembly may further comprise the SIL.

The objective lens housing may be adapted for adjustment of a position of the received objective lens.

In accordance with a second aspect of the present invention there is provided a test station for probing and testing of integrated circuits on a semiconductor wafer, the test station comprising a SIL optics assembly as defined in the first aspect.

In accordance with a third aspect of the present invention there is provided a method of landing a SIL on an object, the method comprising the steps of coupling an objective lens housing having an objective lens received therein to a SIL housing having mounted thereon a SIL; and providing a biased support for the SIL using a spring section integrated in a peripheral wall of the SIL housing.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION OF THE PREFERRED EMBODIMENTS

Figure 1:
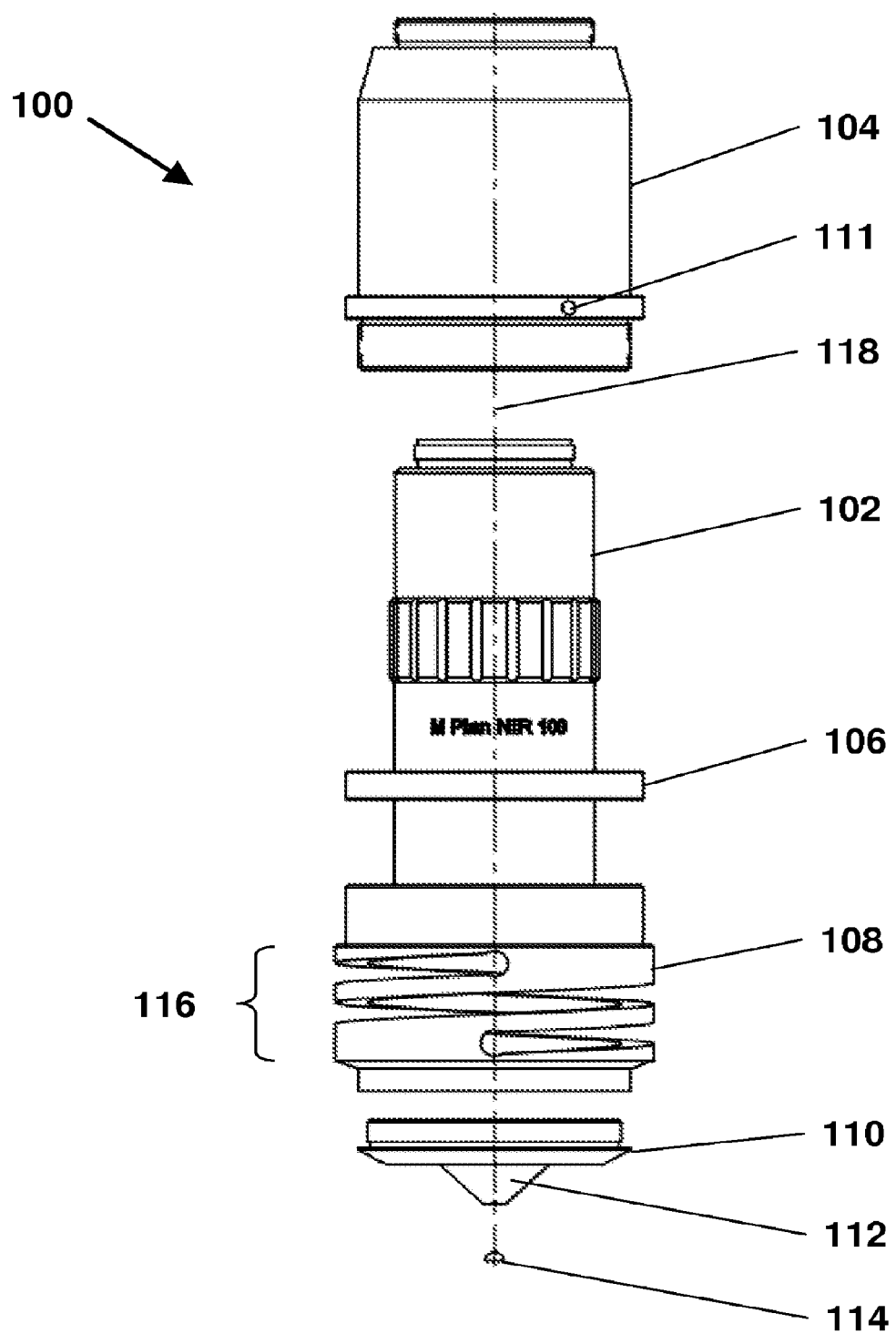
FIG. 1 shows a design drawing showing an exploded side view of a SIL optics assembly according to an example embodiment.

FIG. 1 shows a design drawing showing an exploded side view of a SIL optics assembly 100 according to an example embodiment. The SIL optics assembly comprises an objective lens 102, received within a lens adaptor 104. The lens adapter 104 is adapted for threaded engagement with a spring tube 108. A spacer ring 106 is provided for the SIL optics assembly length adjustment. It will be appreciated that the spacer ring 106 is optional and can be of different height, depending on a desired configuration of the SIL optics assembly 100 for different SIL diameters, and centric and aplanatic imaging applications.

A SIL holder 110 is provided for threaded engagement with the spring tube 108. The SIL holder 110 comprises a raised conical portion 112 for attachment of a solid immersion lens (SIL) 114. The SIL 114 is attached to the SIL holder 110 using epoxy in this example embodiment, but it will be appreciated that other attachment means may be used in different embodiments.

In the example embodiment, relative movement required during focusing of the SIL holder 110 with respect to the objective lens 102 is provided by way of the spring tube 108, which includes an integrated radial spring section 116 forming a hollow cylindrical support for the SIL holder 110 in the example embodiment. The adjustment set screws 111 on the lens adapter 104 allow pre-alignment of the SIL 114 optical axis to the objective optical axis. The hollow cylindrical support preferably maintains the alignment during relative axial movement when focusing.

The compression of the spring tube 108 at and near focus provides a force to eliminate the minute air gap between the SIL 114 and a device under test (DUT) surface, reducing reflection losses and total internal reflection at the interface, thus preferably avoiding NA reduction. It will be appreciated that the spring tube 108 advantageously provides a biased support for the SIL holder 110 in a manner such that shadowing of the SIL 114 by the biasing member can be eliminated.

It will be appreciated that the lens adapter 104 allows exchange of objective lenses 102 of different magnifications and NA to match the type of SIL 114 used. Spring tubes 108 of different spring stiffness can also be used. Increasing the stiffness and thus axial stability of the spring can advantageously improve repeatable SIL placement for imaging and probing. Also, while the radial spring can be formed as a single start helix spring as described in the example embodiment, double or more start helix springs can be implemented in different embodiments to increase axial stability for improving repeatable SIL placement, and to reduce side loading.

The SIL holder 110 can be custom made to hold SILs 114 of different diameters and thickness to cater for DUTs of different substrate thickness. Spacer rings 106 of different heights can be used to adjust the initial offset of the SIL 114 from the par focus of the lens assembly; and thus the compression and force of the spring tube 108 at focus. Furthermore, the spring tube 108 can preferably accommodate a small angular displacement of the SIL holder 110 relative to a central axis 118 of the SIL optics assembly 100 without or with a reduced risk of the SIL holder 110 being "stuck" relative to the objective lens 102. Alternatively or additionally, the DUT may be levelled during operation to achieve better image quality.

In the example embodiment, the lens adapter 104, spacer ring 106, spring tube 108 are fabricated from aluminium. The SIL holder 110 is fabricated from stainless steel. The SIL holder can be made from copper or brass if thermal dissipation through the SIL 114 is required. The spring tube 108 can be made from stainless steel to vary the spring rate and thermal conductivity depending on application.

The SIL 114 material can be gallium arsenide (GaAs) or silicon (Si) in example embodiments. The choice of material typically depends on the wavelength. For example, GaAs is typically used for 1000-1200 nm wavelength and Si for 1200 nm onwards. The SIL 114 can be hemispheres, used for imaging at the centric point or hyper-hemispheres, used for imaging at the aplanatic point. The plano surface of the SIL 114 can also been made convex for better conformance to the device surface.

The lens adapter 104, spacer ring 106 and spring tube 108 are fabricated by turning, and the SIL holder 110 is fabricated by turning and CNC in the example embodiment.

It will be appreciated by a person skilled in the art that other suitable materials and other fabrication techniques may be used in different embodiments for the respective parts without departing from the spirit or scope of the invention.

Figure 2:
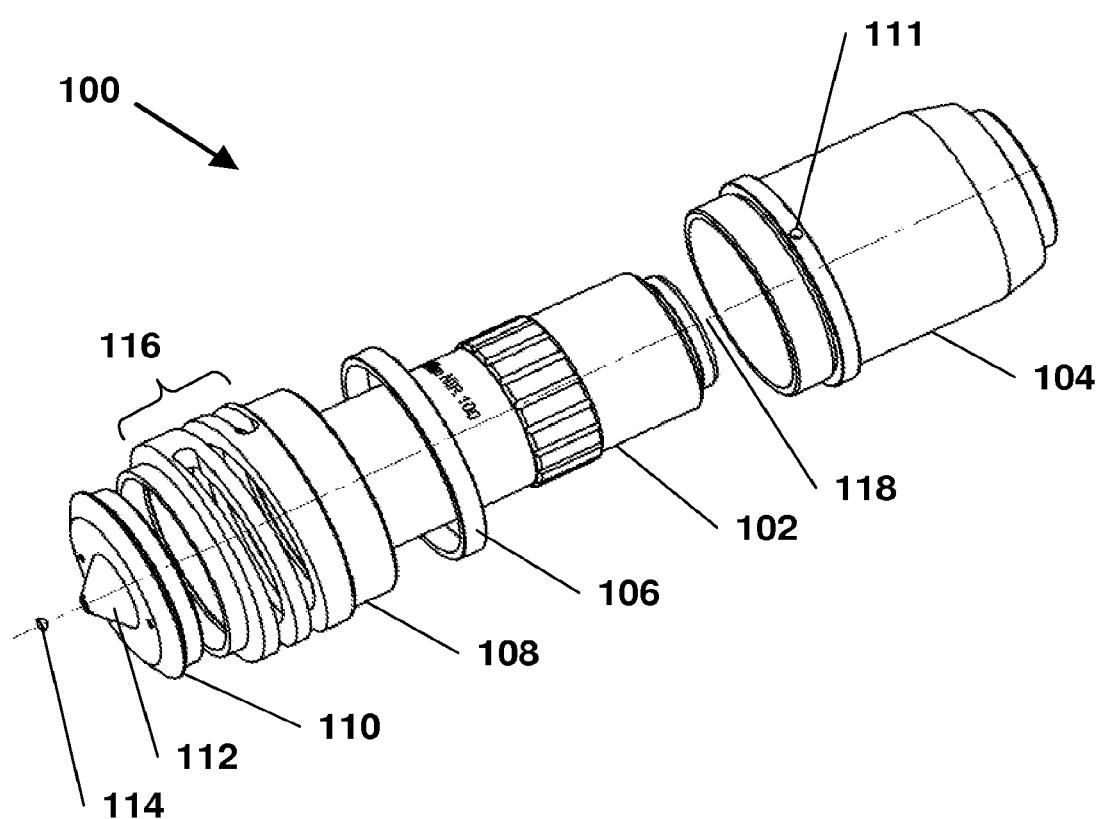
FIG. 2 shows a design drawing showing an exploded perspective view of the SIL optics assembly of FIG. 1.

FIG. 2 shows a design drawing showing an exploded perspective view of the SIL optics assembly 100 of FIG. 1. In FIG. 2, the same reference numerals are used to identify the same parts compared to FIG. 1.

Figure 3:
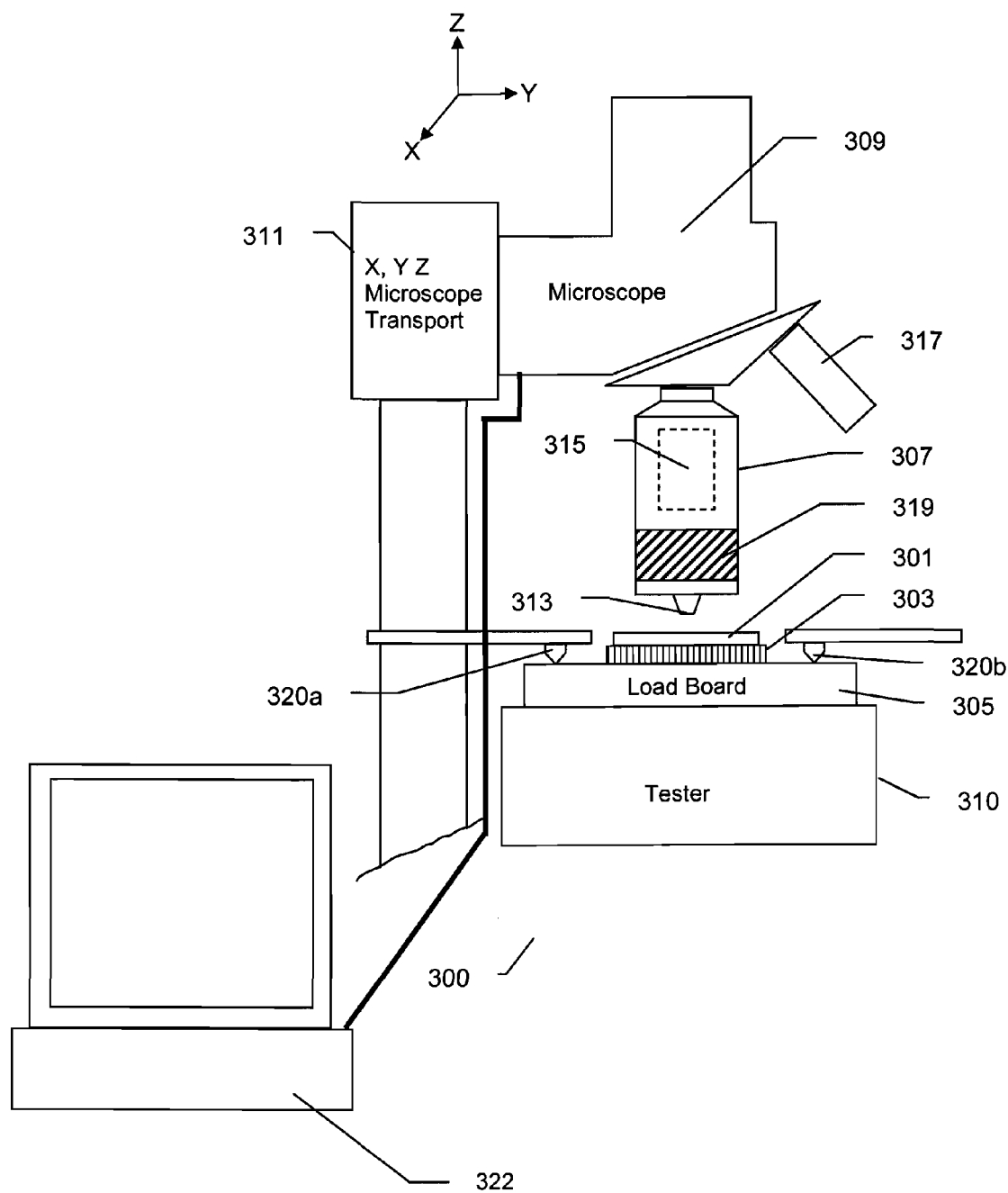
FIG. 3 shows a schematic drawing illustrating a test station for probing and testing integrated circuits on a semiconductor wafer according to an example embodiment.

FIG. 3 shows a schematic drawing of a test station 300 for testing and optical probing of packaged flip chip integrated circuit or device under test (DUT) 301. As will be appreciated by a person skilled in the art, the silicon substrate of the DUT 301 is first thinned and electrical functionality validated. A typical test involves inserting the DUT 301 into a test socket 303 on a load board 305 whilst using a SIL optics assembly 307 to conduct imaging and optical probing through the silicon substrate of the DUT 301.

The test socket 303 and the load board 305 constitute the interface between an electronic test system 310 and the DUT 301. The load board 305 is docked to the microscope system and the docking interface can be fitted with tip and tilt adjustments 320a and 320b for levelling the DUT 301 normal to the SIL optics assembly 307.

The SIL optics assembly 307 is part of a microscope 309 mounted on a scope transport 311 for x, y, z manipulation relative to the backside of the DUT 301. The scope transport 311 in the example embodiment is adapted for manual as well as computer controlled movement.

In the initial set up of the SIL optics assembly 307, the SIL 313 is set at a distance (e.g. 2 mm) further than the par focus of the backing objective lens 315 using the spacer ring (compare 106 FIG. 1). The SIL 313 is centered to the backing objective lens 315 using the alignment set screws (compare 111 FIG. 1). In operation, lower magnification objective lenses 317 on the microscope 309 are used to navigate to the point of interest on the DUT 301. The SIL optics assembly 307 is selected and the microscope transport 311 adjusted to the par center. The microscope transport 311 then lowers the SIL optics assembly down to the par focus position. At the par focus position, the spring tube 319 compression is based on the initial distance offset from the par focus. The spring constant and the compression distance determine the force pressing the SIL 313 and DUT 301 surface together. The microscope transport 311 can be used to adjust the distance between the objective 315 and SIL 313 for fine focus.

As the SIL 313 and DUT 301 are in contact, precautions are preferably observed to prevent damage. Prior to landing, the x, y lateral movement of the microscope transport 311 is disabled after par centre adjustment. This advantageously prevents scratches to the SIL 313 and DUT 301 if accidental x, y movement of the microscope transport 311 occurs. Gross z movement is also disabled to prevent crushing of the SIL 313 or DUT 301. Fine z movement is permitted for focusing, with movement range about the par focus point restricted by software limits in the example embodiment.

In this example embodiment, the test station 300 does not have an image/video analyser. The image of the DUT or image of photon emissions are displayed on the Personal Computer (PC) 322 screen coupled to the microscope 309 for "manual" visual inspection. However, it will be appreciated that an image/video analyser can be provided in different embodiments.

Figure 4:
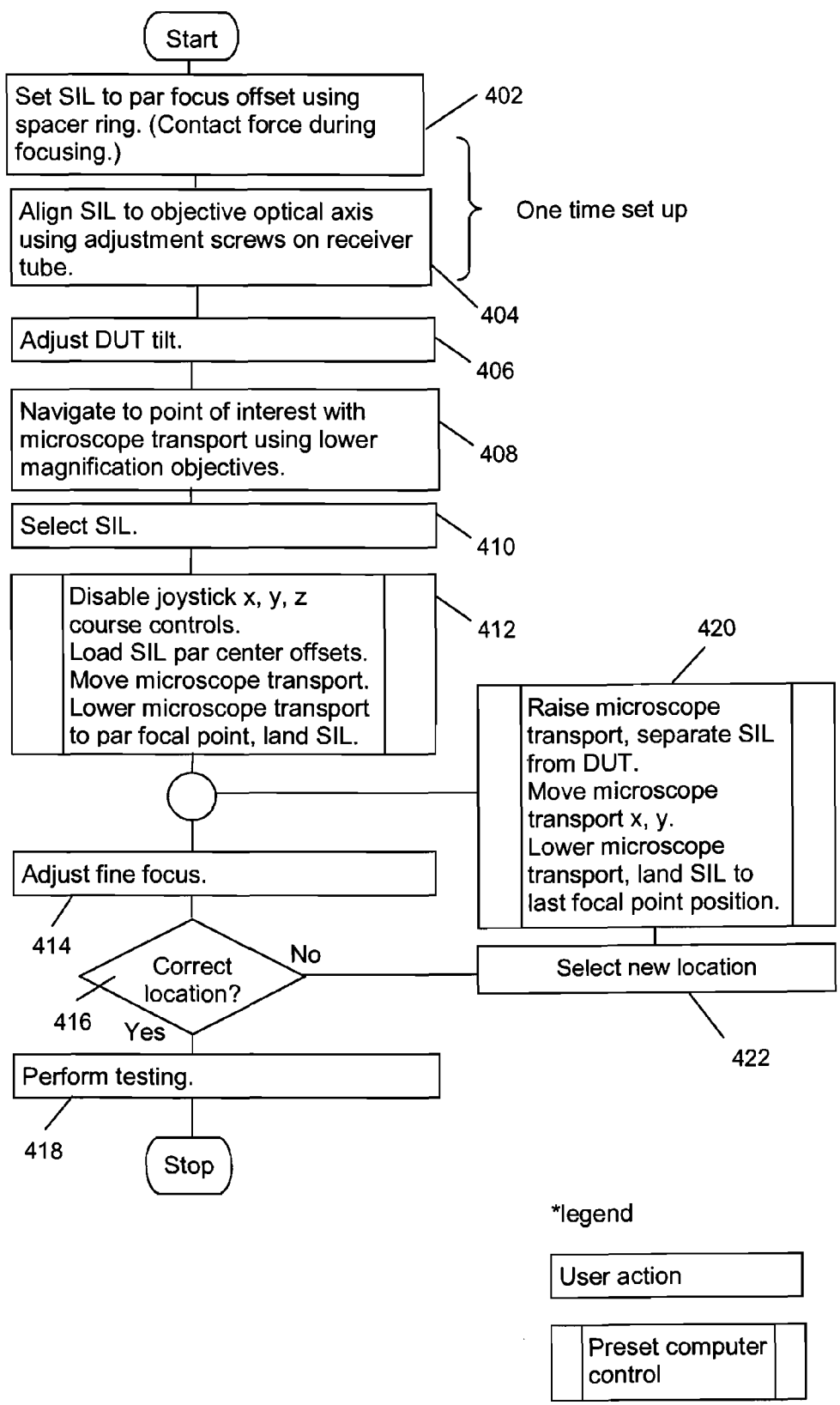
FIG. 4 shows a flowchart illustrating the initial setup and positioning of the SIL optics assembly according to an example embodiment.

FIG. 4 shows a detailed flowchart 400 illustrating the initial setup and positioning of the SIL optics assembly onto a DUT according to an example embodiment. At step 402, the spacer ring is used to offset the SIL from par focal point. The amount of offset determines the contact force when the lens is at par focus (at step 412 below).

Next, at step 404, the SIL is aligned to the objective optical axis using adjustment screws on the lens adaptor in the example embodiment. Steps 402 and 404 are performed as a one time setup in the example embodiment.

Next, a tilt of the DUT is adjusted at step 406, and navigation to the point of interest is performed using the microscope transport and lower magnification objective in place of the SIL optics assembly including the SIL in step 408. After the initial navigation to the point of interest in step 408, the SIL optics assembly including the SIL is selected instead of the low magnification objectives at step 410.

Next, under computer control, the x, y, z, course controls are disabled, and the SIL par center offset is corrected by the microscope transport. Under a preset computer control, the SIL is lowered to par focal point, thus landing the SIL on the DUT at step 412.

Next, at step 414, manual fine z movement is enabled to adjust fine focus. If it is determined at step 416 that the location of the SIL is correct, the testing is performed at step 418. In an example embodiment, the correct location is determined visually or with the aid of computer aided design (CAD) navigation software. There may be two scenarios, for example. First, if the signal from the DUT (either photon emission or laser induced) has been picked up with the lower magnification objectives, the operator uses the SIL lens to obtain a higher magnification and resolution image to more accurately localise the defect. CAD navigation is used to determine the co-ordinates of the location. The second scenario can be that the operator wishes to use a laser beam to probe one or a group of transistors. The operator will use CAD navigation software to move to and identify the correct location. For both scenarios, the operator determines the location of interest. If at step 416 the location is found to be incorrect, at step 420 the microscope transport is raised using the preset computer control, to separate the SIL from the DUT. X, y, movement of the microscope transport is performed using the preset computer control, and the microscope transport lowered to land the SIL to the last focal point position. Thereafter, steps 414 and 416 are repeated until a correct location is confirmed and the testing can be performed at step 418.

At step 422, the operator initially determines the new location but is not allowed direct control of the stage movement to avoid damage from a wrong sequence of moves. Usually the location is within the image field of view and the operator double clicks on the location on screen for the software to calculate the relative x, y movement required to bring the location to the center of the screen. If it is not in the field of view, the operator will have to decide the direction of panning and the software will move x, y by one field of view.

Figure 5:
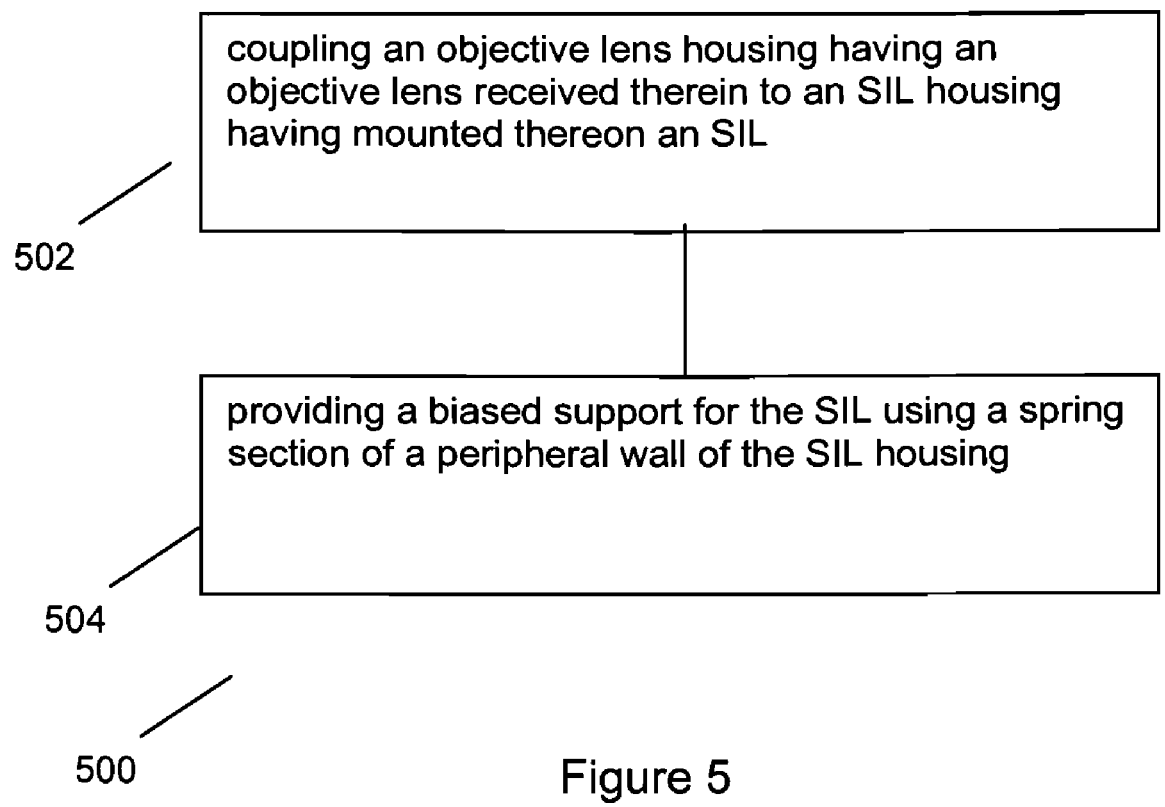
FIG. 5 shows a flowchart illustrating a method of landing SIL on an object, according to an example embodiment.

FIG. 5 shows a flowchart 500 illustrating a method of landing a SIL on an object according to an example embodiment. At step 502, an objective lens housing having an objective lens received therein is coupled to a SIL housing having mounted thereon a SIL. At step 504, a bias support for the SIL is provided using a spring section of a peripheral wall of the SIL housing.

The optics assembly of embodiments of the present invention can be implemented e.g. for photon emission microscopy. In either device imaging or emission imaging, the optics assembly can be used as 'collection' system. In a scanning optical microscopy implementation, for device imaging, the optics assembly can be used as 'collection' system, while in laser induced imaging where the DUT response is imaged, the optics assembly can be used as a 'probe'.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A solid immersion lens (SIL) optics assembly comprising:
   an objective lens adapter for receiving an objective lens, and
   a spring tube for mounting a SIL and adapted for connection to the objective lens adapter;
   wherein a peripheral wall of the spring tube comprises an integrated spring section adapted to provide a biased support for the SIL; and
   wherein the wall of the spring tube is cylindrical, and the spring section comprises a radial spring along a circumference of the cylindrical spring tube.

2. The assembly as claimed in claim 1, further comprising a SIL holder adapted for mounting the SIL, and adapted for connection at a top end of the spring tube.

3. The assembly as claimed in claim 2, wherein the SIL holder comprises a conical mount element extending from a base portion of the SIL holder, the conical mount element adapted for mounting the SIL at an apex thereof.

4. The assembly as claimed in claim 1, further comprising a spacer element for interconnection between the spring tube and the objective lens adaptor.

5. The assembly as claimed in claim 1, further comprising the objective lens.

6. The assembly as claimed in claim 1, further comprising the SIL.

7. The assembly as claimed in claim 1, wherein the objective lens adaptor is adapted for adjustment of a position of the received objective lens.

8. The assembly as claimed in claim 1, wherein the radial spring comprises a single start helix or multiple start helix spring.

9. A test station for probing and testing of integrated circuits on a semiconductor wafer, the test station comprising the SIL optics assembly as claimed in claim 1.

10. A method of landing a SIL on an objective lens, the method comprising the steps of:
    coupling an objective lens adaptor having an objective lens received therein to a spring tube having mounted thereon a SIL; and
    providing a biased support for the SIL using a spring section integrated in a peripheral wall of the spring tube, wherein the wall of the spring tube is cylindrical, and the spring section comprises a radial spring along a circumference of the cylindrical spring tube.

* * * * *